March 9, 1943.  G. WHEATLEY  2,313,414
APPARATUS FOR RETREADING TIRES
Filed Jan. 6, 1937
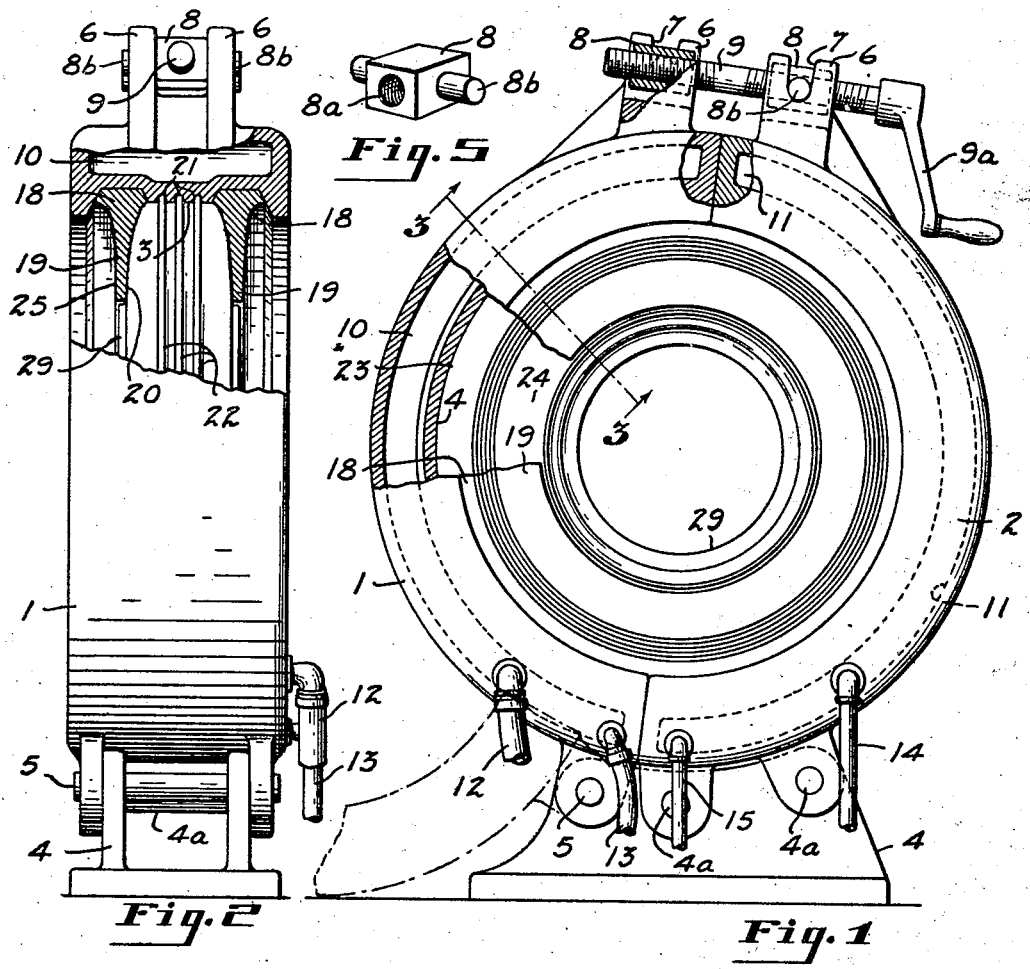
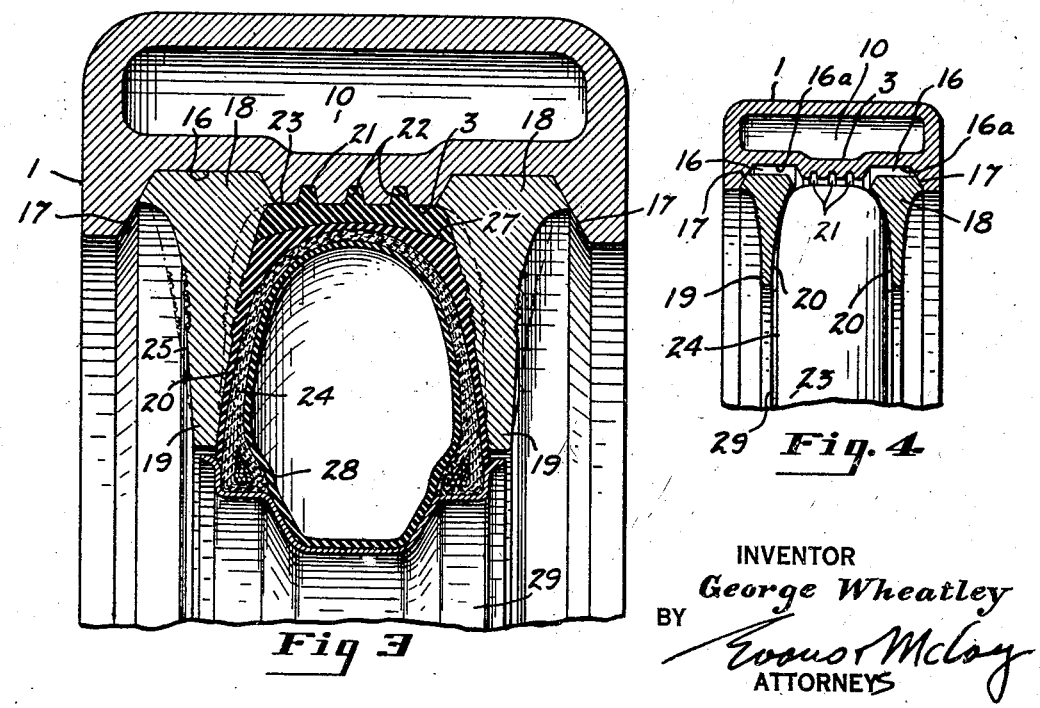
INVENTOR
George Wheatley
BY
Evans & McCoy
ATTORNEYS Patented Mar. 9, 1943

2,313,414

UNITED STATES PATENT OFFICE 2,313,414

APPARATUS FOR RETREADING TIRES

George Wheatley, Akron, Ohio, assignor to The General Tire & Rubber Company, Akron, Ohio, a corporation of Ohio Application January 6, 1937, Serial No. 119,286

17 Claims. (Cl. 18—18)

This invention relates to vulcanizing apparatus for use in retreading vehicle tires with rubber.

One of the objects of the present invention is to provide a tire retreading apparatus which is of simple and economical construction and which is easy to operate.

Another object is to provide a tire retreading apparatus which is efficient in operation and which will provide for the production of a superior product.

Another object is to provide a tire retreading vulcanizer which is capable of retreading tires of different tread width without the necessity of utilizing additional parts.

A further object is to provide a tire retreading vulcanizer which is so arranged that sidewall flash is eliminated in the retreaded tire.

With the above and other objects in view the present invention consists of certain features of construction and combinations of parts to be hereinafter described with reference to the accompanying drawing and then claimed.

In the drawing, which illustrates a suitable embodiment of the invention,

Figure 1 is a side elevation of the vulcanizing apparatus, a portion of the same being in section;

Fig. 2 is an end elevation of the vulcanizing apparatus shown in Figure 1;

Fig. 3 is an enlarged section taken approximately on line 3—3 of Figure 1;

Fig. 4 is a section similar to Fig. 3 but before the movable heater port is completely clamped; and Fig. 5 is a perspective view of one of the clamping blocks.

Referring to the accompanying drawing, in which like numerals refer to like parts throughout the several views, the vulcanizing apparatus includes a pair of arcuate parts 1 and 2 each having a semi-circular radially inwardly facing face 3 for engaging the tire tread which, when the parts are in closed position as indicated in Fig. 1, form a continuous cylindrical tread engaging surface.

One end of the part 2 is mounted on a suitable base 4 by means of pins 4a and the part 1 is hingedly connected at one end to the base 4 by a hinge pin 5, the parting line between the two parts being slightly inclined with respect to the vertical plane. The parts 1 and 2 are each provided at their upper ends with spaced clamping lugs 6 having aligned slots 7 therein. Arranged between each pair of lugs 6 is a screw block 8 having pins 8b extending from its opposite sides and seated in the slots 7. The blocks 8 are provided with oppositely threaded internal bores 8a which receive the oppositely threaded ends of a clamping screw 9 which is provided with a handle or crank 9a. By rotating the screw 9 the part 1 may be drawn into contact with the part 2 or moved away therefrom. When the screw 9 is rotated in a direction to separate the parts 1 and 2 the screw 9 and blocks 8 may be lifted from the assembly to permit the part 1 to be swung to its open position.

The parts 1 and 2 are provided with heating chambers 10 and 11 respectively for receiving a heating medium, the chamber 10 having an inlet conduit 12 and an outlet conduit 13 at its lowest region, and the chamber 11 having an inlet conduit 14 and an outlet conduit 15 at its lowest region.

Arranged at each side of the tread engaging portion or face 3 of each of the parts 1 and 2 is a parallel groove 16 having a flat bottom 16a and divergent side faces 17. These grooves 16 of the one part register with the corresponding grooves of the other part and form continuous circumferential channels when the parts 1 and 2 are clamped together to receive and locate spaced side wall engaging rings 18. The rings 18 are peripherally shaped to snugly fit within the grooves 16 when parts 1 and 2 are clamped together. The rings 18 are each of one piece construction and provided with a radially inwardly extending flange 19, the inner face 20 of which is shaped to engage with the tire sidewall and to form a continuation of the tread engaging face 3 as shown in Figure 3.

The tread engaging face 3 may be recessed to provide a suitable tread pattern and as here shown, is formed with circumferential grooves 21 to form ribs 22 in the tread portion 23 to be vulcanized to the tire casing 24.

Each of the rings 18 is reversible and the outer faces 25 are formed to different shape than their inner faces 20 so that when the rings 18 are reversed as indicated by the broken outline 26 in Fig. 3, the faces 25 then facing each other, the vulcanizer will accommodate a tire casing having a greater width adjacent the tread.

Also, the rings 18 may be replaced by other rings having side faces of different contours.

In the conventional retreading vulcanizers it is the practice to form the portions thereof which engage with the tire casing side walls to a circular shape corresponding substantially to the curvature of the tire casing side walls.

In the construction of the present invention, the side wall engaging faces 20 or 25, as the case may be, of the rings 18 are provided with a slight curvature and are practically straight, and diverge radially inwardly from the tread engaging face 3 so that the tire casing when confined within the vulcanizer has a wedgelike appearance.

The tire casing is prepared for retreading by removing as much of the old tread as is necessary to present an even surface 27. A suitable airbag 28 is positioned within the casing 24 and the casing is mounted on a suitable retaining rim 29.

The vulcanizer is opened and the mounted tire casing 24 with the new tread 23 in position, is disposed against the tread engaging face 3 of the lower part 2 and the side rings 18 are dropped into position at each side of the tire casing and into the grooves 16 of the stationary part 2.

The movable part 1 is then swung to its closed position and clamped by positioning the screw 9 and blocks 8 and rotating the screw 9, the upper portions of the rings 18 being received in the grooves 16. The airbag 28 is then inflated. Because of the fact that the flanges 19 of the rings 18 are of such a radial depth that their inner peripheries are disposed closely adjacent the flanges of tire supporting rim 29 and because of the contour of the side faces of the rings 18, inflation of the airbag causes the tread 23 and adjacent portions of the tire casing to become substantially wedged between the inner faces of the rings 18, causing the tread 23 and the casing 24 to have a complete and intimate contact which insures proper vulcanization of the tread to the casing.

A heating medium is then allowed to enter the chambers 10 and 11 through the inlet conduits 12 and 14 to heat the tread engaging faces to the proper vulcanizing temperature.

After the vulcanizing operation, the retreaded tire casing is easily removed by rotating the screw 9 to release the clamping pressure and by swinging the movable part 1 to its open position, after which the rings 18 and tire casing are lifted from the lower part.

Since the rings 18 are of one-piece construction, no objectionable flash will appear at the side walls of the tire casing. Also, if a wider tread face is desired, the positions of the rings 18 may be reversed. Furthermore, if other side wall contours are desired, the rings 18 may be replaced by other rings having the desired side face shape.

Obviously, therefore, the same vulcanizing parts may be utilized for retreading tires of the same diameter having different tread widths.

The vulcanizing apparatus is simple in construction and is easy and simple to operate.

Although a single embodiment of the invention has been herein shown and described it will be understood that numerous details of the construction shown may be altered or omitted without departing from the spirit of this invention as defined in the following claims.

What I claim is:

1. Vulcanizing apparatus for use in retreading tire casings, comprising a pair of heater parts of semicircular shape engageable with each other, each having a semicircular radially inwardly facing tread engaging face, each face forming a continuation of the other to form a continuous circular surface arranged to contact solely with the road engaging portion of a tire tread, each of said parts having semicircular radially inwardly facing grooves adjacent the edges of said tread engaging face, the grooves in one part being registrable with the grooves in the other part to form spaced continuous ring receiving recesses, a pair of annular rings removably positioned within said recesses and having side faces for engaging the side walls of the tire casing to be retreaded said recesses having sloping side walls engageable with outer marginal edge portions of the rings to draw the rings toward one another during closing of the semicircular heater parts and thereby squeeze the side walls of the tire disposed between the rings, and means for clamping said heater parts together.

2. Vulcanizing apparatus for use in retreading tire casings, comprising a pair of chambered heater parts of semicircular shape engageable with each other, each having a semicircular radially inwardly facing tread engaging face, each face forming a continuation of the other to form a continuous circular surface arranged to contact solely with the road engaging portion of a tire tread, each of said parts having semicircular radially inwardly facing grooves adjacent the edges of said tread engaging face, the grooves in one part being registrable with the grooves in the other part to form spaced continuous ring receiving recesses, a pair of annular rings removably positioned within said recesses and having side faces for engaging the side walls of the tire casing to be retreaded, and means for clamping said heater parts together said recesses having sloping side walls engageable with outer marginal edge portions of the rings to draw the rings toward one another during closing of the semicircular heater parts and thereby squeeze the side walls of the tire disposed between the rings.

3. Vulcanizing apparatus for use in retreading tire casings comprising a transversely split ring-shaped heater member having separable ends, means for drawing said separable ends together to constrict a tire casing within said heater member, a base for supporting said heater member, a pair of side plates of substantially the diameter of the tread face of said tire casing supported by said heater member, said plates being insufficient in extent to engage more than a relatively small portion of the road engaging area of the tire tread and circumferentially discontinuous over the central portion of said road engaging area of the tire tread, and means for drawing said side plates toward each other.

4. Vulcanizing apparatus for use in retreading tire casings comprising a ring-shaped heater having an interior face adapted to encircle the tread of a tire and through which heat is supplied to the tread to vulcanize the same, said ring-shaped heater being transversely split and having separable ends adapted to be drawn one toward the other to clamp the heater upon the tread of a tire, means for drawing the ends of said heater together to clamp the same upon the tread of a tire, circular members of at least the diameter of the interior face for confining the side walls of the tire, and means on the heater for holding the members in position during vulcanization, said holding means arranged to retain the members in spaced, substantially parallel relation while the heater is open and the ends of the heater separated and to gradually draw the members axially together as the heater is closed and the ends clamped together.

5. A mold for vulcanizing tires, comprising an annular heater having an inwardly directed face for embracing the road-engaging tread portion of a tire, a pair of rings disposed in spaced parallel relation on opposite sides of the face, said rings each having an outer peripheral portion constituting a retainer provided with symmetrical sides to permit reversal of the rings, means at the sides of the heater face for engaging the retainer portions of the rings to secure the rings in the mold, each of said rings being of a diameter at least equal to that of said face, and each of said rings having an annular inwardly directed flange portion provided with side faces adapted to contact tire side walls, both of said side faces being offset inwardly with respect to the periphery of the ring and being positioned on opposite sides of the equatorial plane of said retainer portion and at unequal distances from said plane whereby reversal of the rings alters the spacing of the flange portions.

6. Apparatus for vulcanizing tires, comprising a ring shaped heater having an interior face to embrace the tread of a tire, said heater being transversely split and having separable ends adapted to be drawn together to clamp the heater upon a tire, means for drawing the ends of the heater together, and circular means interiorly of the heater and positioned on each side of said face and having an outer periphery of at least the diameter of the interior face for confining the side wall of a tire in the heater, said circular means being insufficient in extent to engage more than a relatively small portion of the road-contacting area of the tire tread and circumferentially discontinuous over the central portion of said road-contacting area of the tire tread, locating means on the heater for engaging the circular means, and said circular means and locating means having sliding engagement with one another and being shaped to progressively compress the side wall of a tire during the drawing together of the heater ends.

7. Apparatus for vulcanizing tires, comprising a heater having an inwardly directed circular face for engaging only the road-contacting tread portion of a tire, a pair of removable rings positioned in spaced relation on opposite sides of the heater face, said rings being circumferentially discontinuous over the tread portion of a tire in the mold and each having an outside diameter at least equal to the diameter of said face and the confronting sides of the rings being formed to diverge from adjacent such face to substantially the inner peripheries of the rings.

8. Apparatus for vulcanizing tires, comprising an annular heater having an interior circular face for contacting solely the road-engaging tread portion of a tire, said heater being transversely split and having separable ends adapted to be drawn together to close the heater upon a tire, radially inwardly facing grooves in the heater adjacent and substantially parallel to the edges of the face, rings which are each of an outside diameter at least equal to the diameter of the heater face disposed in the grooves and formed with side faces for contacting the side wall of a tire, said grooves having sloping side walls which extend radially inwardly toward the center of the heater beyond the interior face and are engageable with the rings to draw the rings in the direction of the interior face during the closing of the heater to thereby compress the side walls of a tire to be vulcanized, and means for drawing the heater parts together.

9. A tire vulcanizing mold comprising an annular heater having an inwardly directed face for contacting the road-engaging portion only of a tire tread, a pair of side wall confining rings each having different configurations on its opposite sides, said rings having outer peripheries at least equal in diameter to the heater face and symmetric on both sides of the rings to permit reversal of the rings in the mold, and ring holding means at each side of the heater face for engaging the outer peripheries of the rings to locate the rings in the mold, the sides of said holding means being symmetrical to correspond to the symmetric peripheries of the rings, and such heater face being arranged to cooperatively form with both sides of the rings a continuous tire receiving cavity in which the side wall defining rings and tread defining heater face have contours which blend into one another.

10. In a vulcanizing mold for a tire, a ring for confining the tire side wall, said ring having a relatively thick outer periphery and a relatively thin inner periphery, the outer peripheral portion of the ring constituting a retainer by means of which the ring may be retained in the mold, said retainer being symmetric on both sides of the ring so that the ring may be reversed in the mold, and the side faces of the ring being formed with different tire side wall configurations.

11. In a vulcanizing mold for a tire, a ring for confining the side wall of a tire, said ring having a relatively thick outer periphery and a relatively thin inner periphery, the outer peripheral portion of the ring constituting a retainer by means of which the ring may be retained in the mold, said retainer being symmetric on both sides of the ring so that the ring may be reversed in the mold, the opposite side faces of the ring each being concave and formed with a tire side wall configuration, and the ring having a generally tapering cross-section from its relatively thick retainer at its outer periphery to its relatively thin inner periphery.

12. In a vulcanizing mold for a tire, a ring for confining the side wall of a tire, said ring having a relatively thick outer periphery and a relatively thin inner periphery, the two side faces of the ring each being concave and formed with a tire side wall configuration and one of said side faces having greater concavity than the other side face.

13. In a vulcanizing mold for a tire, a ring for confining the side wall of a tire, said ring having a relatively thick outer peripheral portion constituting a retainer, a circular flange extending inward from the retainer for engaging the side wall of a tire, and said retainer having a substantially cylindrical outer peripheral surface and sloping side surfaces which converge toward said cylindrical outer surface at substantially the same angularity.

14. A mold for vulcanizing tires, comprising an annular heater having an inwardly directed circular face for embracing the road-engaging tread portion of a tire, a pair of rings disposed on opposite sides of said face for confining the side walls of a tire, each of said rings having a diameter at least equal to the diameter of the circular face and a relatively thick outer peripheral portion constituting a retainer, means disposed at the sides of said face for engaging the retainers to secure the rings in the mold, and the sides of the rings which are directed toward one another being formed with tire engaging faces which diverge radially inwardly substantially from said tread embracing face of the heater to substantially the inner peripheral edges of the rings to effect a distortion of a tire disposed therebetween to substantially a wedgelike appearance in radial cross-section.

15. Apparatus for vulcanizing tires, comprising a bag disposable within a tire for inflating the same, a rim for mounting the tire, an annular heater having an inwardly directed circular face for embracing the road-engaging tread portion of a tire, a pair of rings disposed in spaced relation on opposite sides of the face for confining the side walls of the inflated tire, each of said rings having an outer peripheral portion constituting a retainer and the rings each having a diameter at least equal to the diameter of the heater face, means disposed at the sides of said face for engaging the retainers to secure the rings in the heater, said rings being supported in the heater solely by the interengagement of said means and the retainers of the rings, and the inner peripheral margins of the rings being substantially free and unsupported, the sides of the rings directed toward one another being formed with tire engaging faces which extend substantially from said heater face to said rim.

16. Vulcanizing apparatus for retreading tires, comprising arc-shaped heater parts movable toward and away from one another and having inwardly directed faces which cooperatively form a substantially continuous circular surface to engage solely the road contacting portion of a tire tread, said parts having circumferential grooves adjacent the edges of the faces, the grooves in one part being registrable with the grooves in the adjacent part to form continuous circumferential recesses, and rings disposed in said recesses and having side faces for engaging a tire.

17. In a vulcanizing machine for retreading tires, a matrix adapted to extend across and engage only the tread portion of the tire lying between the shoulders of the tire to cure said portion only of the tire, means associated with said matrix for supplying heat thereto, a pair of shoulder strip matrices removably associated with said matrix to form therewith a substantially continuous matrix extending across the tread portion and over the shoulder strip portions of the tire to cure a retreaded tire, said shoulder strip matrices forming metallic contact with said first-mentioned matrix whereby said shoulder strip matrices are heated by conduction of heat from said first-mentioned matrix.

GEORGE WHEATLEY.